US011911908B2

(12) United States Patent
Dupuis et al.

(10) Patent No.: US 11,911,908 B2
(45) Date of Patent: Feb. 27, 2024

(54) DYNAMIC PROBABILISTIC MOTION PLANNING

(71) Applicant: Intrinsic Innovation LLC, Mountain View, CA (US)

(72) Inventors: Jean-Francois Dupuis, San Francisco, CA (US); Keegan Go, Mountain View, CA (US); Michael Hemmer, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 340 days.

(21) Appl. No.: 16/229,484

(22) Filed: Dec. 21, 2018

(65) Prior Publication Data
US 2020/0198140 A1    Jun. 25, 2020

(51) Int. Cl.
*B25J 9/16*        (2006.01)
*G05D 1/00*        (2006.01)
*G05D 1/02*        (2020.01)
*G06F 17/18*       (2006.01)

(52) U.S. Cl.
CPC .......... *B25J 9/1666* (2013.01); *G05D 1/0214* (2013.01); *G05D 1/0274* (2013.01); *G05D 1/0289* (2013.01); *G06F 17/18* (2013.01)

(58) Field of Classification Search
CPC ... B25J 9/1666; G05D 1/0214; G05D 1/0289; G05D 1/0274; G06F 17/18
See application file for complete search history.

(56) References Cited

U.S. PATENT DOCUMENTS

| 8,712,679 | B1 * | 4/2014  | Mostofi ............... G05D 1/0274 |
|           |      |         | 701/300                             |
| 9,707,681 | B2 * | 7/2017  | Davidi .................. B25J 9/1682 |
| 9,833,901 | B2 * | 12/2017 | Perrone ............... G05D 1/0088 |
| 10,108,193| B2 * | 10/2018 | Wernersbach ....... G05D 1/0212 |
| 2003/0079207 | A1 | 4/2003 | Xavier et al.                   |

(Continued)

FOREIGN PATENT DOCUMENTS

CN     103278164 A    9/2013
WO     WO 2017/214581   12/2017

OTHER PUBLICATIONS

Debord et al., "Trajectory Planning for Heterogeneous Robot Teams," 2018 IEEE/RSJ International Conference on Intelligent Robots and Systems (IROS), Oct. 2018, 7924-7931.

(Continued)

*Primary Examiner* — Khoi H Tran
*Assistant Examiner* — Rodney P King
(74) *Attorney, Agent, or Firm* — Fish & Richardson P.C.

(57) ABSTRACT

Techniques and systems are disclosed for using swept volume profile data cached in association with a PRM to improve various aspects of motion planning for a robot. In some implementations, a first probabilistic road map representing possible paths to be travelled by a robot within a physical area is generated. An initial path for the robot within the first probabilistic road map is determined. Data indicating a second probabilistic road map representing a path to be travelled by a movable object within the physical area is obtained. A potential obstruction associated with one or more edges included in the subset of edges is detected. An adjusted path for the robot within the first probabilistic road map is then determined based on the potential obstruction.

18 Claims, 7 Drawing Sheets

(56) References Cited

U.S. PATENT DOCUMENTS

| | | | |
|---|---|---|---|
| 2014/0368504 A1* | 12/2014 | Chen | G06T 17/005 345/424 |
| 2016/0370802 A1* | 12/2016 | Ueda | G05D 1/0214 |
| 2017/0028559 A1 | 2/2017 | Davidi et al. | |
| 2017/0120448 A1* | 5/2017 | Lee | B25J 9/1666 |
| 2017/0210008 A1 | 7/2017 | Maeda | |
| 2017/0344009 A1 | 11/2017 | Wernersbach | |
| 2017/0361468 A1* | 12/2017 | Cheuvront | G06F 16/00 |
| 2018/0001472 A1* | 1/2018 | Konidaris | G06N 7/005 |
| 2018/0239343 A1* | 8/2018 | Voorhies | G05D 1/0234 |
| 2018/0250818 A1 | 9/2018 | Maeda | |

OTHER PUBLICATIONS

Leven et al., "A Framework for Real-time Path Planning in Changing Environments," International Journal of Robotics Research, Dec. 2002, 999-1030.

PCT International Search Report and Written Opinion in International Appln. No. PCT/US2019/067728, dated Apr. 7, 2020, 18 pages.

van den Berg et al., "Anytime path planning and replanning in dynamic environments," Proceedings 2006 IEEE International Conference on Robotics and Automation, May 2006, 2366-2371.

van den Berg et al., "Roadmap-based motion planning in dynamic environments," Proceedings of 2004 IEEE/RSJ International Conference on Intelligent Robots and Systems, Sep. 2004, 1598-1605.

Wagner et al., "Probabilistic path planning for multiple robots with subdimensional expansion," 2012 IEEE International Conference on Robotics and Automation, May 2012, 2886-2892.

PCT International Preliminary Report on Patentability in International Appln. No. PCT/US2019/067728, dated Jun. 16, 2021, 10 pages.

Office Action in Brazil Appln. No. 1120210062769, dated Jun. 27, 2023, 6 pages (with English translation).

Office Action in Chinese Appln. No. 201980065164.3, dated Sep. 26, 2023, 20 pages (with machine translation).

* cited by examiner

DYNAMIC PROBABILISTIC MOTION PLANNING

TECHNICAL FIELD

This specification generally describes technology related to robotics, and more particularly, to motion planning systems.

BACKGROUND

Motion planning systems for robotic technology can use a probabilistic roadmap (PRM) to determine a path between a starting point of a robot and an end point of the robot while avoiding collisions. For example, a motion planning system can use a PRM to take random samples from a space of a robot and test them to determine whether the sampled locations are in free (e.g., unobstructed) space. The PRM can specify nodes representing specified coordinates within the space and edges that connect these nodes to represent movement by the robot between two nodes.

SUMMARY

Motion planning using a probabilistic road map (PRM) often involves a construction phase and a query phase. In the construction phase, a roadmap (or graph) is generated to approximate motions that can be made in the environment. A random node is initially created and then connected to neighboring nodes, e.g., the nearest neighbors within a predetermined distance. Nodes and edges are then added to the graph until the roadmap is dense enough to represent different motion pathways in the space. In the query phase, the start and end points are connected to the graph, and a path is identified for the robot.

In some implementations, a system can use swept volume profile data cached in association with a PRM to improve various aspects of motion planning for a robot. The planned motion may represent transitions within a space, such as a physical area. In some implementations, a swept volume represents the space that a robot (or a component of the robot, such as an arm or an appendage) would pass through or occupy while the robot travels along an edge defined in the PRM. For example, the swept volume for an edge may be a three-dimensional volume representing the volume that would be traced by a robot traveling along the edge. The swept volume profile data identifies a swept volume of predicted motion by the robot for each edge within the PRM, so that the system can compute and adjust paths in a more computationally efficient manner and with less delay. For example, after an initial computation stage, once the system receives a query that involves configuring a motion path for a robot, the system can use the cached information already specified in the swept volume profile data to configure a path instead of having to estimate swept volumes on the fly after receiving the query. In this manner, swept volume profile data computed during the initial PRM computation stage is already available to be used for each received query, and the system does not incur the delays or inefficiencies of computing swept volumes on query-by-query basis. As another example, the system can use cached information to improve the speed of collision detection processing, since the system can use cached swept volume information to check for collisions each time a path is adjusted, which prevents the need to re-compute swept volume information for each path adjustment. The efficiency and speed improvements of this approach can be very substantial, especially in systems that coordinate movement of multiple robots in a common area.

The system can also use the cached swept volume profile data to further reduce the computational complexity associated with path adjustment process as it relates to collision detection. For example, if the system detects a potential collision along an initial path, instead of re-calculating the entire path, the system can identify and route around the affected nodes or edges of the path that are near the potential collision. The system can adjust portions of the initial path based on the cached swept volume information for edges that are affected by the potential collision. In this situation, the system is able to adjust only those portions of the initial path that are determined likely to be affected by the potential collision (e.g., the system can avoid re-computing and changing unaffected portions of the initial path), since the swept volume profile data includes edge-specific cached swept volume information, i.e., swept volume information for individual edges specified within the PRM.

As described throughout, a "robot" refers to a machine capable of automatically carrying out actions, such actions programmable by a computer. For example, a robot can one that is capable of movement in a given environment. The mobile robot can be capable of navigating the environment without the need for physical or electro-mechanical guidance devices. The mobile robot, in some instances, can rely on guidance devices that allow them to travel a pre-defined navigation route in a relatively controlled space. As another example, the robot can be an industrial robot that is attached a fixed surface. The industrial robot execute tasks within a workcell and be configured to avoid collisions with other industrial robots operating in the same workcell (e.g., multiple robots welding a car in a factory). The industrial robot can be a jointed arm (e.g., multi-linked manipulator), a gripper assembly (e.g., end effector), or a tool/end effector attached to a robot arm, among others.

As discussed further below, a "swept volume" refers to a volume containing all points that would be occupied by an object, such as a robot, at some time based on motion of the object over a time period. For example, for an object that moves along a path, the swept volume can represent the points in space that the object occupies while traveling along the path—including the initial volume occupied by the object, the ending volume occupied by the object, and all points that the object passed through in between. A swept volume associated with an edge of a PRM for an object represents the total volume that the object (e.g., a robot) is calculated to pass through when the object moves along the path represented by the edge. As described in detail below, in some instances, the swept volume for an object can be represented using an image that includes pixels representing a two-dimensional representation of the swept volume. In other instances, the swept volume for the object can be represented as voxels coinciding space that may be occupied by the object within a physical area. Other representations of swept volumes and other data structures may similarly be used.

In one general aspect, a computer-implemented method includes: generating, by the one or more computers, a first probabilistic road map representing possible paths to be travelled by a robot within a physical area, the first probabilistic road map comprising (i) a first plurality of edges that each connect nodes within the first probabilistic road map, and (ii) a swept volume profile of the robot for each edge included in the first plurality of edges; determining, by the one or more computers, an initial path for the robot within the first probabilistic road map, the initial path specifying a subset of edges from among the first plurality of edges; obtaining, by the one or more computers, data indicating a second probabilistic road map representing a path to be travelled by a movable object within the physical area, the second probabilistic road map comprising (i) a second plurality of edges that each connect nodes within the second probabilistic road map, and (ii) a swept volume profile of the movable object for each edge included in the second plurality of edges; based on the swept volume profiles of the robot for the first plurality of edges and the swept volume profiles of the movable object for the second plurality of edges, detecting, by the one or more computers, a potential obstruction associated with one or more edges included in the subset of edges; and determining, based on the detection of the potential obstruction, an adjusted path for the robot within the first probabilistic road map, the adjusted path specifying a different subset of edges from among the plurality of edges.

One or more implementations can include the following optional features. For instance, in some implementations, the path travelled by the movable object within the physical area specifies a second subset of edges within the second probabilistic road map. Additionally, detecting a potential obstruction associated with one or more edges included in the subset of edges includes: comparing the swept volume profiles of the robot that are associated with the subset of edges specified by the initial path and the swept volume profiles of the movable that are associated with the second subset of edges; determining, based on the comparison of the swept volume profiles of the robot that are associated with the subset of edges specified by the initial path and the swept volume profiles of the movable that are associated with the second subset of edges, that one or more edges within the first subset of edges and one or more edges within the second subset of edges correspond to an overlapping region within the physical area; and determining, based on the determination that the one or more edges within the first subset of edges and one or more edges within the second subset of edges correspond to an overlapping region within the physical area, that the one or more edges included in the first subset of edges are associated with a potential obstruction.

In some implementations, each swept volume profile included in the swept volume profiles of the robot for the first plurality of edges specifies a maximum traversable area by the robot within a physical space in association with a particular edge from among the plurality of edges.

In some implementations, each swept volume profile included in the swept volume profiles of the robot for the first plurality of edges specifies a set of voxels representing the maximum traversable volume by the robot within a physical space in associated with the particular edge from among the plurality of edges.

In some implementations, the movable object includes a second robot that travels within the physical area.

In some implementations, determining an adjusted path for the robot within the first probabilistic road map includes: identifying a plurality of alternative paths corresponding to the initial path. In such implementations, each alternative path within the plurality of alternative path includes (i) a first edge representing a start point of the initial path and (ii) a second edge representing an end point of the initial path, and each alternative path includes a different set of intermediate edges between the first edge and the second edge; and selecting a particular alternative path from among the plurality of alternative paths as the adjusted path.

In some implementations, selecting a particular alternative path from among the plurality of alternative paths as the adjusted path includes: computing, for each alternative path within the plurality of alternative paths, a score representing a probability of a detected obstruction along a particular alternative path; and selecting the particular alternative path from among the plurality of alternative paths as the adjusted path based on the scores representing the probabilities of a detected obstruction along the alternative paths.

In some implementations, the method further includes: determining that a number of edges included in the subset of edges that are associated with the detected obstruction satisfies a predetermined threshold. Additionally, determining an adjusted path for the robot within the first probabilistic road map includes: invalidating the initial path based on the determination that the number of edges included in the subset of edges that are associated with the detected obstruction satisfies the predetermined threshold; and recalculating a new initial path for the robot within the first probabilistic road map.

In some implementations, the new initial path specifies a new subset of edges from among the plurality of edges. Additionally, the new subset of edges includes edges that were not included in the subset of edges, and the number of edges that were not included in the subset of edges exceeds a threshold value.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
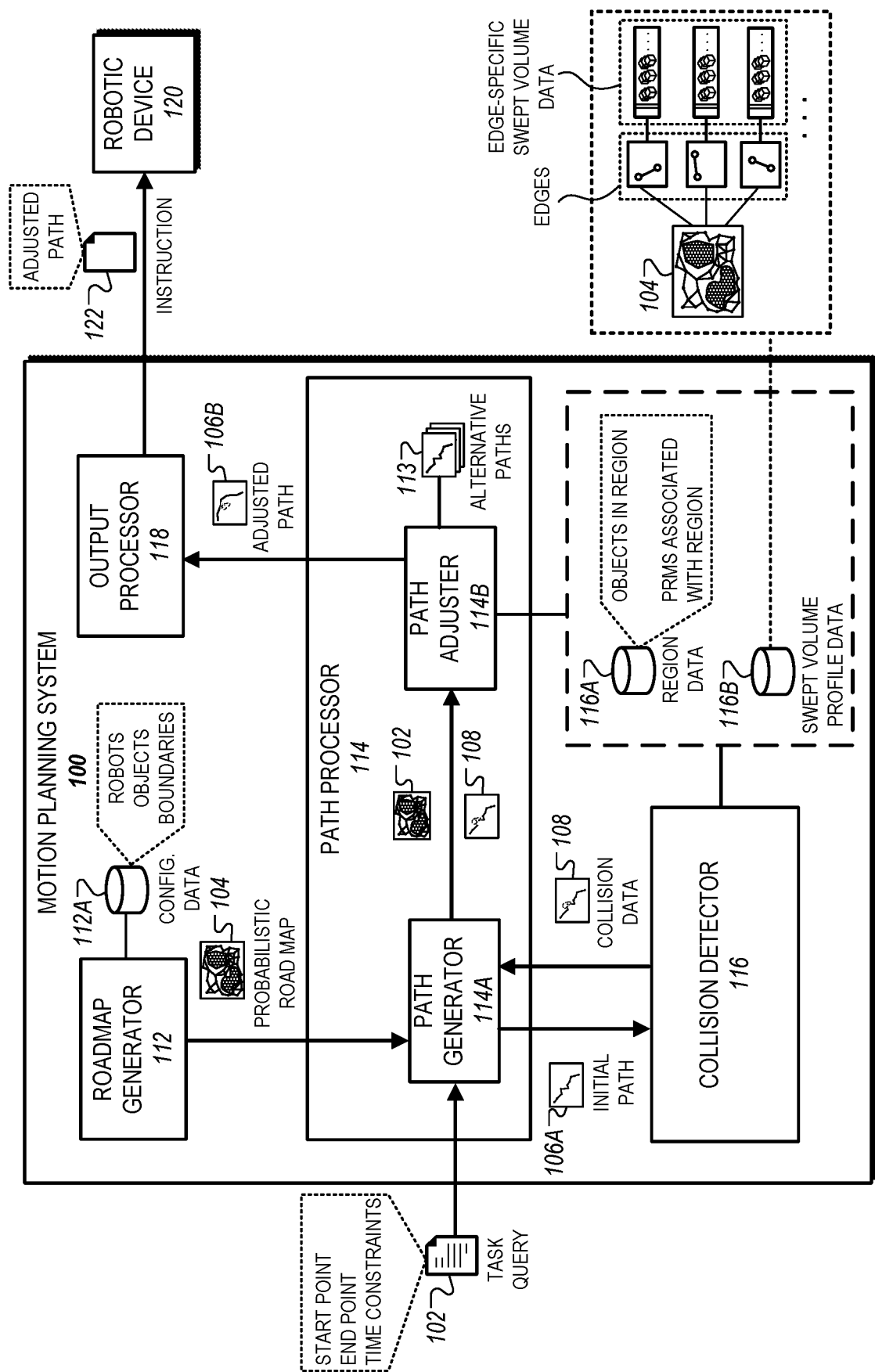
FIG. 1 illustrates an example of a system that is capable of performing motion planning using swept volume profile data.

FIG. 1 illustrates an example of a motion planning system 100 that can use swept volume profile data for collision detection and path adjustment for a robotic device 120. The system 100 includes a roadmap generator 112, a path processor 114, a collision detector 116, and an output processor 118. The path processor 114 includes a path generator 114A and a path adjuster 114B.

In the example depicted in FIG. 1, the system 100 plans motion for the robotic device 120 in two phases—(1) a construction phase and (2) a query phase. During the construction phase, the roadmap generator 112 processes configuration data 112A for a space where the robotic device 120 moves throughout. The configuration data 112A can include information for the space, such as other robots that will also move in the space, known objects in the space, such as static or moving objects, boundaries that define a physical area of the space, or the type of physical area represented by the space. The space can represent different types of environments in which the robotic device 120 is deployed to perform tasks. For example, the space can be within an industrial environment, such as an area in a factory or an area on a construction site. In such examples, the robotic device 120 can be deployed to perform tasks, such as transporting components between different areas of the space, manipulating components for an assembly procedure, among others. In other examples, the space can be within a commercial environment, such as an area in an office building, or within a residential environment, such as an area in personal property.

Figure 2A:
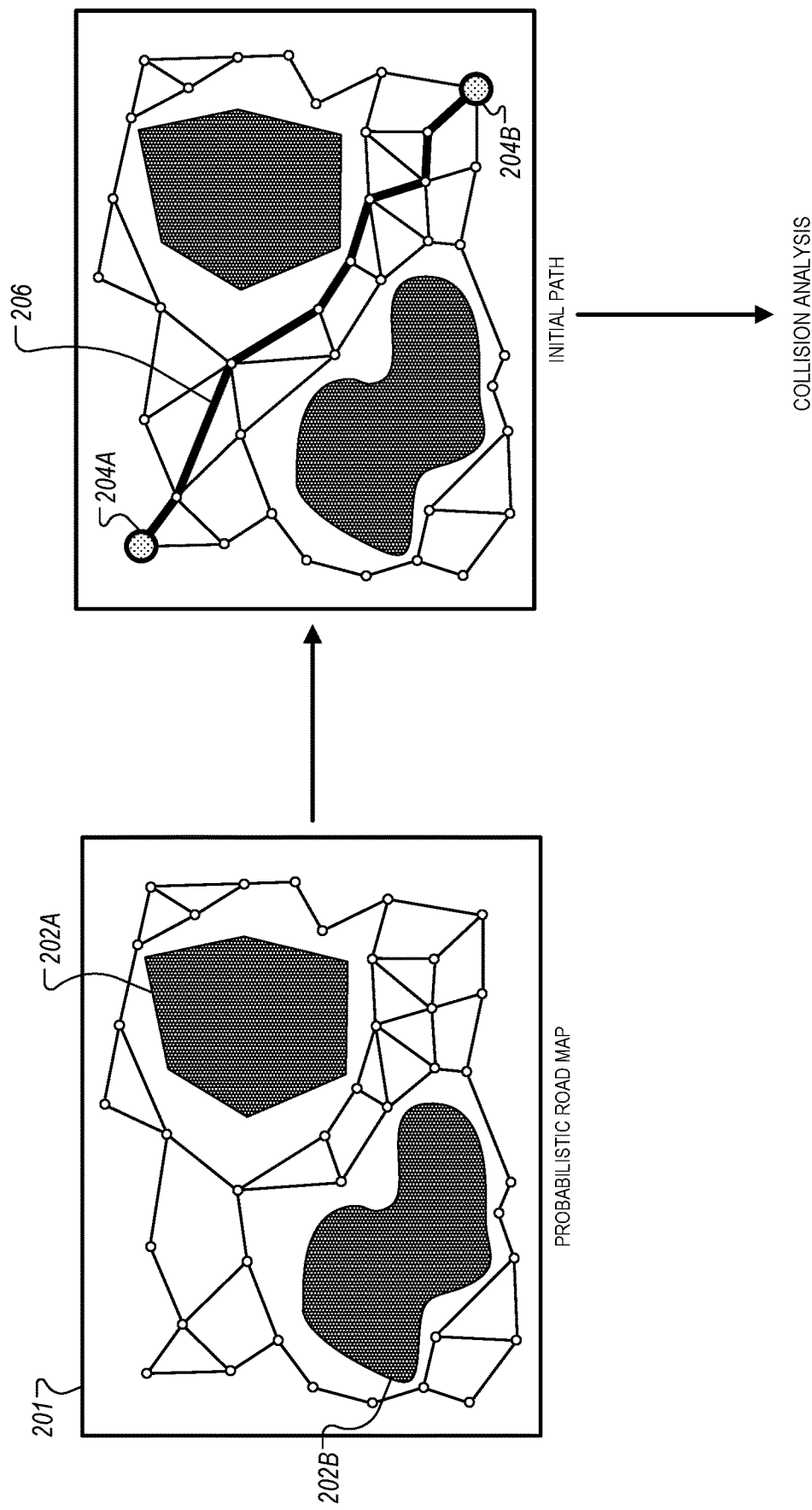
FIGS. 2A-2B illustrate an example of a dynamic path adjustment for a robot within a probabilistic roadmap.
Figure 2B:
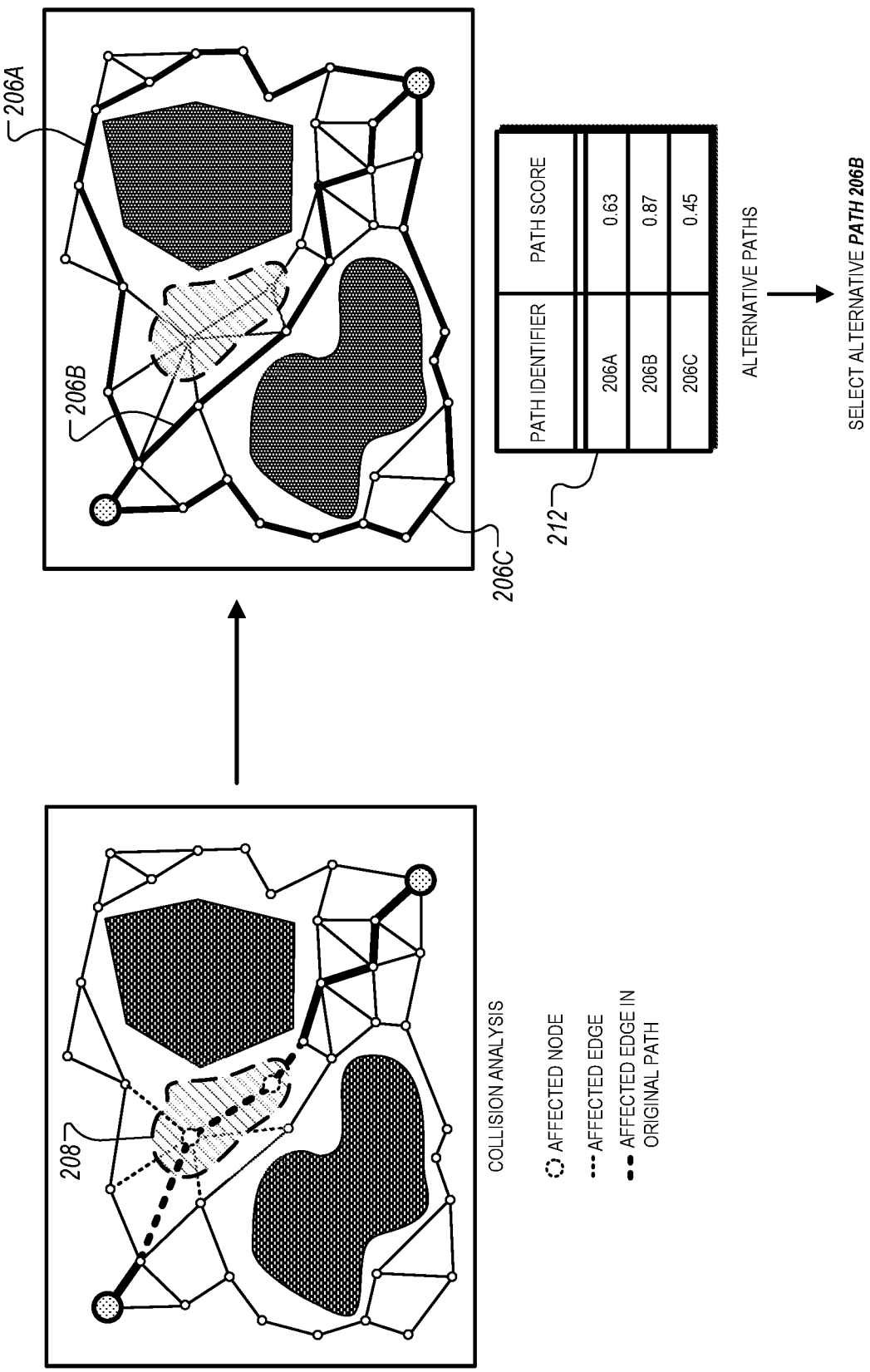

The roadmap generator 112 generates a PRM 104 for the robotic device 120 based on the configuration data 112A. The PRM 104 approximates the motion that the robotic device 120 makes within the space and identifies a set of possible motion paths that the robotic device 120 can take within the space. For example, as shown in FIGS. 2A-2B, the PRM 104 identifies a set of nodes and edges that characterize the motion of the robotic device 120 within the space. The roadmap generator 112 can generate the PRM 104 by taking random samples of points in the space, testing them to determine whether they are in free space, i.e., not occupied by an object or an obstruction, and then connecting the points to other nearby points in free space. The roadmap generator 112 can use this sampling technique to identify a set of possible obstruction-free motion paths within the space for the robotic device 120. As another example, the roadmap generator 112 can use an obstruction-based approach where known obstructions within the configuration data 112A are used in the sampling technique to identify points in free space.

Once the PRM 104 has been generated, the roadmap generator 112 generates swept volume profile data 116B to be cached in association with the PRM 104. The swept volume profile data 116B includes a swept profile for each edge identified in the PRM 104 (shown in detail in FIG. 3). Each swept volume profile identifies a maximum traversable movement by the robot device 120 within the physical space in association with a particular edge from the PRM 104. The swept volume profiles can represent movement of the robotic device 120, depending on the complexity of path adjustment and the precision involved in collision detection and/or path adjustment. For example, in some instances, the swept volume profiles are stored as a set of two-dimensional swept volume images that represent a maximum traversable area by the robotic device 120 within the physical space. In other instances, the swept volume profiles are stored as a set of three-dimensional swept volume voxels that represent a maximum traversable volume by the robotic device within the physical space.

The roadmap generator 112 caches the swept volume profile data 116B in association with the PRM 104 prior the system 100 receiving a query 102 for the robotic device 120 to perform a task. In this sense, the PRM 104 and swept volume profile data 116B are generated prior to the query phase of motion planning. The roadmap generator 112 caches the PRM 104 and the swept volume profile data 116B so that, during the query phase of motion planning, the collision detector 116 can perform collision detection without having to compute swept volumes associated with path determination. Moreover, in some instances, the swept volume profile data 116B specifies swept volume profiles for each edge of the PRM 104 so that the system 100 uses the swept volume profile data 116B to evaluate multiple possible paths without having to re-compute swept volume profiles for different edges of the PRM 104. In this manner, caching of the swept volume profile data 116B reduces the complexity and/or computational burden of collision detection performed during the query stage of motion planning.

In some implementations, the system 100 can use the PRM 104 and cached swept volume profile data 116B to improve motion choreography of multiple robots that move within the space. For example, multiple robots might move in the space during overlapping time periods, which may increase the likelihood of a collision during execution of tasks by the robots. In such implementations, during the construction phase, the system 100 generates and caches a respective PRM and associated swept volume profile data for each robot that moves within the space. Each PRM and swept volume profile data uniquely characterizes the motion of a corresponding robot within the area, and therefore can be used for planning the motions of multiple robots to reduce collisions.

Figure 4:
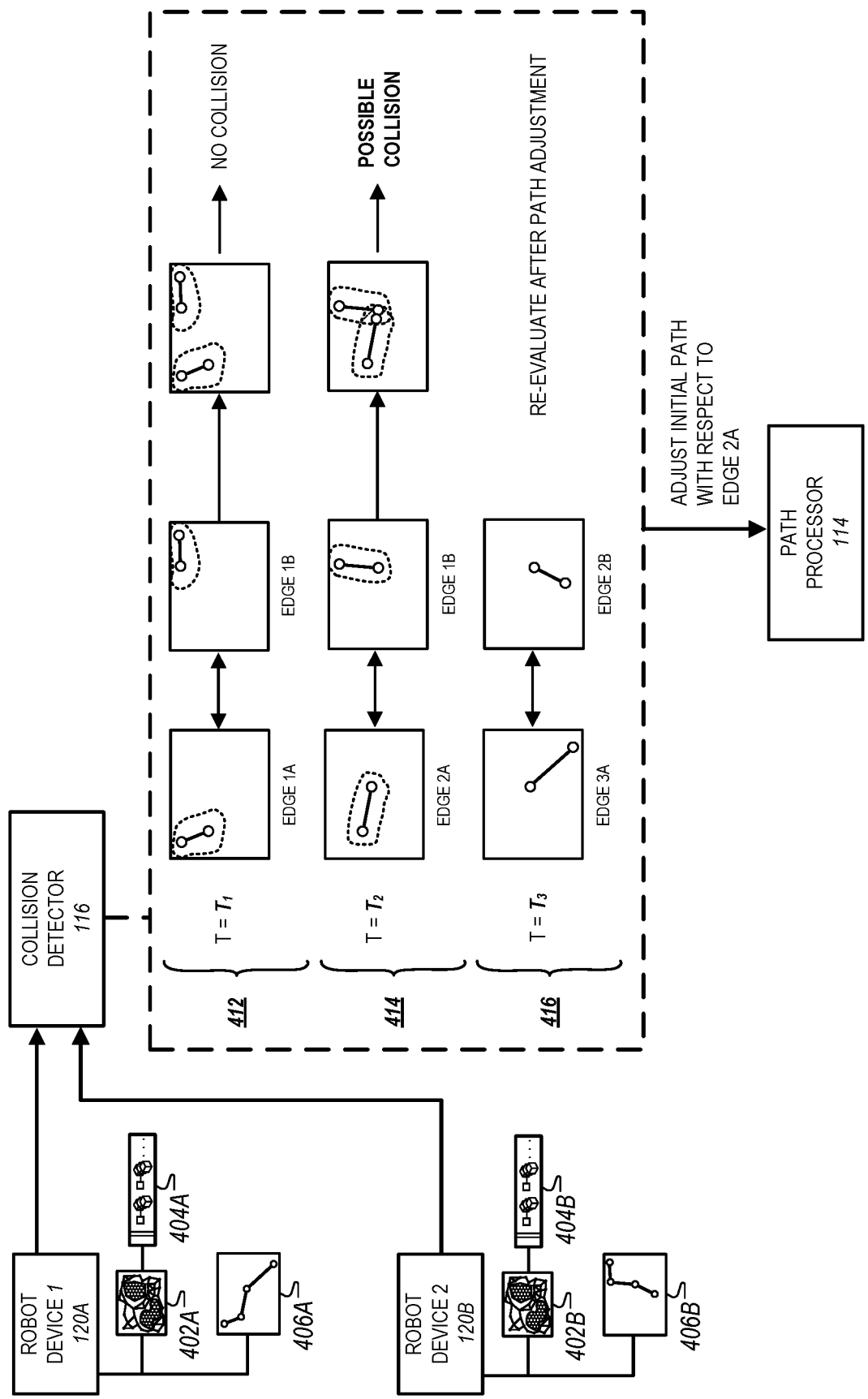
FIG. 4 illustrates an example of a technique for detecting a potential collision between planned paths of two robots.

For example, during the query phase, the system 100 can use the cached swept volume profile data for two robots to evaluate the likelihood of a collision between the robots (shown in FIG. 4). In this example, the system compares swept volume profiles for edges in the PRMs for the two robots that coincide with the same time interval to identify an overlap in the swept volumes, which represents a likelihood of a collision occurring. As discussed above, because the swept volume profiles are cached during the construction phase, the system 100 can perform these comparisons during the query phase without having to compute the swept volumes of the two robots.

In some implementations, the system 100 can use the cached swept volume profile data to improve time synchronization of movements by multiple robots within a space. For example, if the system 100 is planning paths for two robots between time points $T_1$ to T2, the system 100 can evaluate the paths to identify edges that correspond to the same times, and compare associated swept volume profiles to determine if a collision will occur. For instance, the system 100 can determine that the two robots will occupy different areas of the space if the swept volume profiles of the two robots for edges coinciding with the same time interval show no overlap. Alternatively, the system 100 can determine a collision may occur if the swept volume profiles for edges coinciding with the same time interval show an overlap. In this scenario, the system 100 uses the detected collision to adjust the paths of one of the robots, or both, depending on the path adjustment technique employed.

Referring now to the query phase, after the PRM 104 with swept volume information has been generated for the robotic device 120 and other robotic devices that will be working in the area, the system 100 uses the PRMs to generate collision-free paths. The system 100 receives the query 102 for the robotic device 120 to perform a task. The query 102 specifies a start point for robot motion, an end point for the robot motion, and time constraints associated with motion of the robotic device 120 from the start point to the end point. As another example, rather than receive a query 102 from another system or device, the system 100 may identify a desired movement of the robotic device 120 from the start point to the end point in other ways. For example, the system 100 may access information about tasks to be performed, assign the tasks among various robots, and plan the tasks as sequences of paths traveled by the robots.

The path generator 114A identifies an initial path 106A for the robot to travel between the start point and the end point as specified within the query 102. The initial path 106A is comprised of a set of nodes and edges within the PRM 104 that connect the start point and the end point. In many cases, the initial path 106A may be the shortest or most direct path between the start point and end point. Examples of paths are illustrated in FIGS. 2A and 2B.

The collision detector 116 determines whether the initial path 106A would result in (or would present too high of a risk of) a collision with a static object or a moving object. The collision detector 116 can make this determination efficiently by comparing the previously-computed swept volume information for the edges in the initial path 106A with the volume information about static objects and moving objects. In particular, it is very easy to use the PRMs and planned paths of different robots to detect collisions that may occur from the dynamic movement of the robots. For example, because swept volumes are precomputed and stored with the PRMs for each robot, it is simple to compute whether the edges of planned paths of different robots conflict. For example, if two robots each have an initial planned path and the swept volumes for the paths overlap, the movement along the paths cannot be executed at the same time. Further, the fine-grained nature of the swept volume information (e.g., for each individual edge) allows the collision detector 116 to efficiently identify which edges conflict (e.g., which edges have overlapping swept volumes), which allows efficient re-planning to avoid the conflicting edges.

The collision detector 116 processes region data 116A in determining the likelihood of a collision in the initial path 106A. The region data 116A identifies, for instance, objects in a physical region associated with the PRM 104, or other PRMs that represent the motion of other movable objects within the physical region during which the robotic device 120 is also expected to move along the initial path 106A. In an example involving a static object, such as an obstruction, the collision detector 116 identifies coordinates within the PRM 104 that are associated with the static object and compares their distance from coordinates of nodes of the initial path 106A. In another example involving a dynamic object, such as another robotic device, the collision detector 116 can access a PRM of the dynamic object to identify motion of the dynamic motion relative to the motion specified by the initial path 106A.

The collision detector 116 also processes cached swept volume profile data 116B that was generated for the PRM 104 in the construction phase, as discussed above. The swept volume profile data 116B includes a swept profile for each edge that is specified in the PRM 104 (shown in detail in FIG. 3). Each swept volume profile identifies a maximum traversable movement by the robot device 120 within the physical space in association with a particular edge from the PRM 104.

The collision detector 116 provides collision data 108 to the path generator 114A. The collision data 108 (1) identifies whether a collision is likely to occur as the robotic device 120 travels along the initial path 106A, and if so, (2) identifies edges of the PRM 104 that are associated with the predicted collision. For example, the collision data 108 can identify the specific edges included in the initial path 106A where the robotic device 120 is predicted to collide with an object.

The path adjuster 114B processes the PRM 104 for the robotic device 120 and the collision data 108 to identify a set of alternative paths 113 that avoid or reduce the possibility of a collision. For example, as shown in FIG. 2B, each path included in the set of alternative paths 113 includes the start point and end point specified by the query 102 but specifies different sets of nodes or edges that avoids a region of the PRM 104 that the collision data 108 indicates as likely resulting in a collision. In the example depicted in FIG. 1, the path adjuster 114B selects a path from among the set of alternative paths 113 that represents the shortest collision-free path from the start point and the end point specified in the query 102 as adjusted path 106B, and provides the adjusted path 106B to the output processor 118.

The output processor 118 generates an instruction 122 with path information for the adjusted path 106B and provides the instruction 122 to the robotic device 120. The instruction 122 can specify an ordered list of nodes contained in a path, which the robotic device 120 uses to execute the path. In some instances, the robotic device 120 stores the instruction 122 after receiving it from the output processor 118 and while it accumulates other instructions to perform related tasks in the area. For example, the robotic device 120 can receive the instruction 122 within a sequence of instructions to perform a batch of tasks at a later time point. In this example, the robotic device 120 executes the task specified by the query 102 and according to the instruction 122 once all instructions have been received. In some other instances, the robotic device 120 executes the task specified by the query 102 upon receiving the instruction 122 by following motion along the adjusted path 106B instead of the initial path 106A. This ensures that the probability that the robotic device 120 experiences a collision while executing the task is reduced.

In some implementations, the path adjuster 114B can invalidate the initial path 106A and generate a new path entirely instead of adjusting a portion of the initial path 206A to generate the adjusted path 106B, as discussed above. In such implementations, the path processor 114 can identify the number of edges of the initial path 106A are affected by a potential collision and determine that the number of affected edges satisfies a predetermined threshold, e.g., greater than 50% affected edges among all edges of the initial path 106A. The path adjuster 114B invalidates the initial path 106A based on the determination and recalculates a new path for the robotic device 120 within the PRM 104. For example, the path adjuster 114B can identify an entirely new path between the start point and end point of the query 102 so that the new path and the initial path do not share a large portion of intermediate nodes, e.g., paths 206A and 206C as depicted in FIG. 2B.

In some instances where the path adjuster 114B recalculates a new path, the path adjuster 114B can evaluate the new path to determine whether it actually represents a different path from the initial path 106A. For example, the path adjuster 114B can identify edges that are specified by the new path that were not specified by the initial path 106A and compare the number of new edges to a threshold value. If the number of new edges exceeds the threshold value, e.g., greater than 50% new edges from among edges of the new path, then the path adjuster 114B determines that the newly calculated path actually represents a new, different, and distinct path from the initial path 106A.

FIGS. 2A-2B illustrate an example of a dynamic path adjustment for a robot within a PRM. In the example depicted, a PRM 201 indicates nodes associated with potential movement of a robotic device, e.g., the robotic device 120, within a physical area. The PRM 201 also indicates edges that connect two or more nodes within the PRM 201. The PRM 201 also indicates obstructions 202A and 202B that restrict movement of the robotic device within the physical area.

The example shows a path 206 within the PRM 201 that the system 100 determined for a robotic device that is expected to travel between a start point 204A and an end point 204B. In this example, the path 206 is defined by nine nodes (including two nodes that represent the start point and the end point) and eight edges that connect the nodes along the path 206. As shown in FIG. 2A, the path 206 is identified based on the arrangement of nodes within the PRM and the presence of obstructions 202A and 202B.

Referring now to FIG. 2B, collision detection is performed for the path 206 to identify any potential collisions in association with the path 206 within the PRM 201. The example shows that a potential collision has been identified, represented by a collision region 208 that represents the physical area where a robotic device travelling along the path 206 is likely to collide with another object. The collision region 208 represents regions of overlap or other conflict between the swept volumes of edges in the PRM and the volume of one or more obstacles, e.g., a static volume of a static obstacle or a swept volume along a path of a moving obstacle.

As discussed above in reference to FIG. 1, the system 100 identifies a potential collision and the collision region 208 based on determining that the swept volume profile for the corresponding edges overlaps with either a movable object or the swept volume profile of another robot that moves in the space. For example, the area defining the collision region 208 can represent the amount of overlap between the swept volume profiles of corresponding edges in the PRMs for two robots that move in the space.

The system 100 then identifies affected nodes and/or or edges of the path 206 based on the collision region 208. In the example depicted in FIG. 2B, the affected nodes are nodes of the path 206 that fall within the collision region 208 and affected edges are edges of the path 206 that are connected with the affected nodes. In other examples, where the collision region 208 does not encompass any nodes, the system 100 identifies affected edges of the path 206, which represent edges of the path 206 that overlap with the collision region 208. In some other examples, the affected nodes can also be nodes that are within a threshold distance from a boundary of the collision region 208, e.g., within one meter from the boundary. Edges associated with the affected nodes are also identified to determine adjustments to be made to the path 206 to avoid the collision region 208. As shown in FIG. 2B, two nodes and seven associated edges are identified as being affected by the collision region 208.

In the example depicted in FIG. 2B, the system 100 identifies alternative paths for the path 206 within the PRM 201 and determines that path 206B represents the best alternative collision-free path, as shown in table 212. In this example, the system 100 determines that the path 206B is the best path relative to the alternative paths 206B and 206C because it is the shortest path from the start point 204A to the end point 204B. The paths 206A-C represent alternative paths to the path 206, i.e., different paths between the start point and the end point within the physical area. As shown in FIG. 2B, the system 100 identifies the paths 206A-C because they specify motion that avoids the collision region 208 and thereby reduce the likelihood of a possible collision as a robotic device travels between the start point and the end point along a particular path.

The system 100 evaluates each of the paths 206A-C to determine the path to select as the most suitable alternative to the path 206. In the example depicted in FIG. 2B, the results of path evaluation are represented by path scores specified within table 212. In this example, the path score represents a relative assessment of each path. For instance, a higher path score can indicate that a corresponding path is a stronger alternative path for the path 206 compared to other alternative paths.

In the example depicted in FIG. 2B, path 206B is identified as having the highest path score of "0.87," which is then used to select path 206B as an alternative to the path 206. In this example, the path 206B is determined to have the highest path score since it is the shortest alternative path between the start point and the end point that avoids the collision region 208. In other instances, other types of evaluation criteria can be used to compute path scores and select a particular alternative path from among multiple alternative paths. As examples, such evaluation criteria can include a number of edges included in a path, motion complexity associated with traveling along a path, or proximity of edges or nodes to collision regions, among others.

Although FIG. 2B depicts the system 100 identifying three alternative paths 206A-C, in some implementations, the system 100 simply identifies the next-best alternative to the original path 206 without identifying multiple possible alternatives. In such implementations, the system 100 identifies a portion of the original path 206 that is impacted by the collision region 208 and adjusts that portion of the path without re-computing new alternative paths. For example, the system 100 adjusts the parts of the original path 205 that are predicted to interact with the collision region 208 and re-routes the path to form path 206B. In this example, the system 100 identifies as selects alternative path 206B without computing or identifying the alternative paths 206A and 206C to improve the efficiency and/or reduce computational burden associated with path adjustment.

Figure 3:
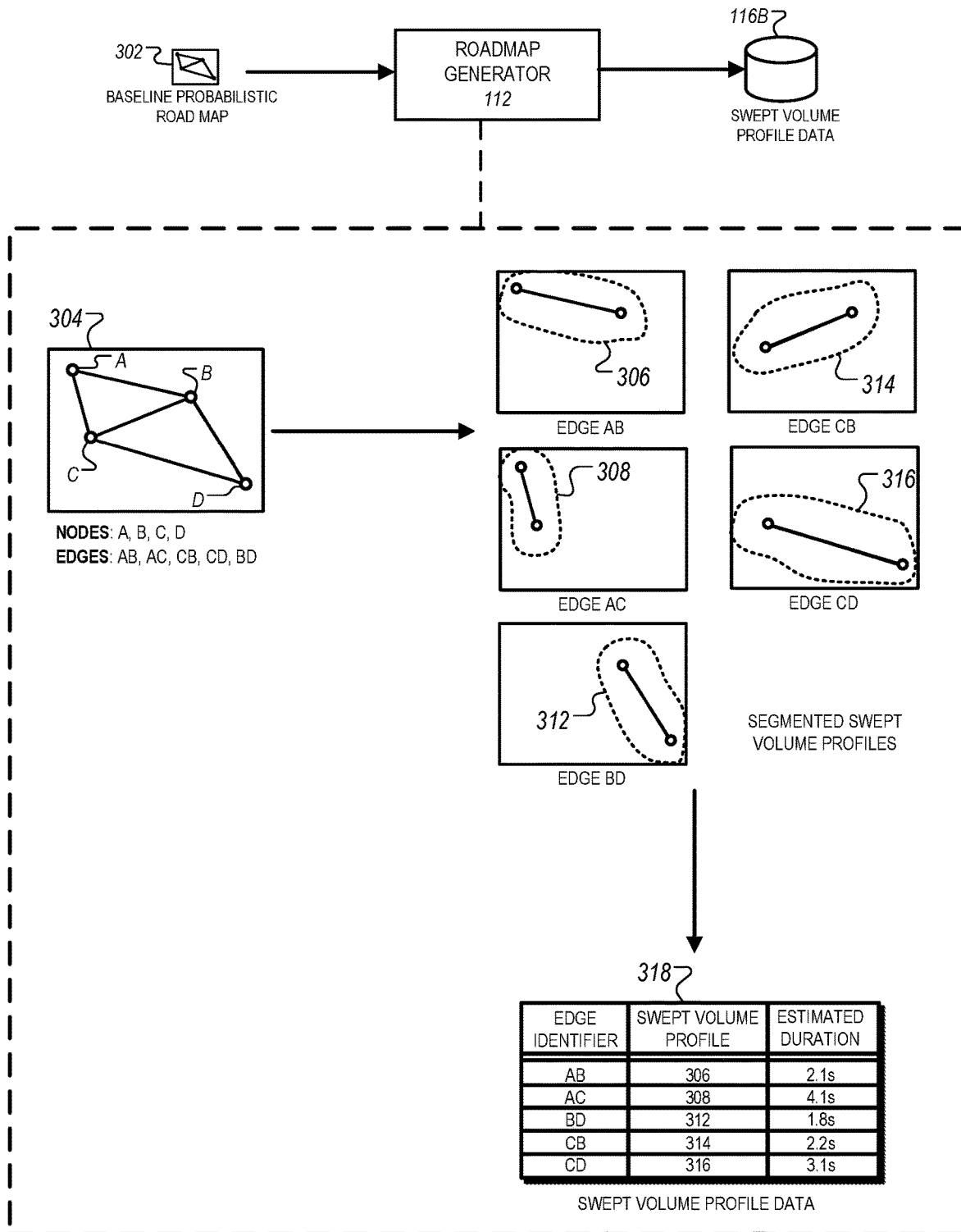
FIG. 3 illustrates an example of generating swept volume profile data.

FIG. 3 illustrates an example of generating swept volume profile data 116B. As discussed above, the roadmap generator 112 generates the swept volume profile data 116B during the construction phase of the motion planning process prior to receiving a query for a robotic device to perform a task. In some instances, roadmap generator 112 generates the swept volume profile data 116B during the PRM generation process as nodes and edges are identified for a physical area through which a robotic device may travel. In other instances, the swept volume profile data 116B is generated after the PRM generation process but prior to the path adjustment techniques that are described above in reference to FIG. 1. For example, once a PRM has been generated, the roadmap generator 112 can receive data representing motion attributes of a robotic device, which are then mapped to the PRM to identify swept volume profiles for predicted motion associated with each edge of the PRM, as discussed below.

In the example depicted in FIG. 3, the roadmap generator 112 receives a baseline PRM 302 as input. The roadmap generator 112 identifies nodes within the PRM, e.g., "A," "B," "C," and "D," and edges associated with the identified nodes, e.g., "AB," "AC," "CB" "CD" "BD."

The roadmap generator 112 determines a swept volume profile for each identified edge within the PRM 302. In the example, the roadmap generator 112 identifies swept volume profile 306 for edge "AB," swept volume profile 308 for edge "AC," swept volume profile 312 for edge "BD," swept volume profile 314 for edge "CB," and swept volume profile 316 for edge "CD." The roadmap generator 112 generates the swept volume profiles 306, 308, 312, 314, 316 by taking into account various factors that impact the robot's motion within a space. For example, the roadmap generator 112 can factor in the size and shape of the robotic device, and different configurations (poses) of the robot as it travels in the space.

The roadmap generator 112 generates each of the swept volume profiles 306, 308, 312, 314, 316 by projecting motion of the robot along a corresponding edge. As examples, the roadmap generator 112 can determine three-dimensional motion profile of the robot along each edge, calculate extent of that profile while moving along edge in the PRM, and/or determine all voxels that the moving robot profile would pass through.

Once generated, the swept volume profiles 306, 308, 312, 314, 316 can be stored in different data formats based on the type of swept profile computed. In some implementations, the swept volume profiles are stored as a set of voxels representing a three-dimensional motion profile of the robot along a particular edge. In some other implementations, the swept volume profiles are stored as simplified two-dimensional positions with entire vertical area of the space considered to be potentially occupied by the robot. The two-dimensional illustrations of the swept volume profiles shown in FIG. 2D are intended for clarity, although the system 100 stores the swept volume profiles to represent actual three-dimensional position data.

The edge-specific swept volume profile for a particular edge can represent the total volume that a robotic device would pass through while traveling along the particular edge. For example, the system can determine the 3D profile of the robotic device, then determine the swept volume as the sum of voxels that would be touched by or encompassed within the 3D profile at any point as it moves along the particular edge. The swept volume can be identified using various motion evaluations techniques, including those involving convex generators, polyhedral approximation, motion sampling along a trajectory, dimensional transformation matrices, among others.

The roadmap generator 112 generates table 318 to map each edge to its corresponding swept volume profile. The table 318 also includes timing information associated with motion along each edge, such as an estimated duration for a robotic device to travel along an edge. As other examples, the table 318 can also source data that is used to predict the estimated duration, such robot specifications, e.g., robot poses joint configurations, type of motion used by the robot, measurements associated with edge distance, speed estimates, or space information, e.g., surface type, friction coefficients, etc. The table 318 can be stored in the swept volume profile data 116B and accessed, for example, by the collision detector 116 and the path adjuster 114B during the collision detection and path adjustment process, respectively, as discussed above in reference to FIG. 1.

FIG. 4 illustrates an example of a technique for detecting a potential collision between planned paths of two robots. In this example, the collision detector 116 evaluates the PRMs of two robotic devices that travel in the same physical area during an overlapping time period. The collision detector 116 determines whether a collision is likely to occur between the robotic devices based on the evaluation as discussed above in reference to FIG. 1.

In the example depicted in FIG. 4, the collision detector 116 receives a PRM 402A, swept volume profile data 404A, and path 406A for robotic device 120A, and a PRM 402B, swept volume profile data 404B, and path 406B for robotic device 120B. In this example, the collision detector 116 performs collision detection to determine whether a collision is likely to result between the robotic devices 120A and 120B as they travel along their respective paths 406A and 406B.

As shown in FIG. 4, the collision detector 116 performs collision detection on an edge-by-edge basis, i.e., by comparing edges of the paths 406A and 406B that correspond to overlapping time frames. For instance, at step 412, the collision detector 116 compares edge 1A from path 406A to edge 1B from path 406B to compare motion of the robotic devices 120A and 120B between time points $T_1$ and $T_2$. In this instance, the collision detector 116 determines that a collision will not occur since there is no overlap between the swept volume profiles of edges 1A and 1B.

At step 414, the collision detector 116 compares edge 2A from path 406A to edge 1B from path 406B to compare motion of the robotic devices 120A and 120B between time points $T_2$ and $T_3$. In this instance, edge 2A is compared to edge 1B since timing data associated with paths 406A and 406B indicates that the time for the robotic device 120B to traverse edge 1B is roughly the same as the time for the robotic device 120A to traverse both edges 1A and 2A. In this regard, the collision detector 116 can consider speed associated with traversing a path in determining corresponding edges between paths that should be compared for collision detection.

As shown in FIG. 4, at step 414, the collision detector 116 determines that a collision is likely to occur since there is overlap between the swept volume profiles of edges 2A and 1B. The collision detector 116 determines that a path adjustment is likely needed to path 406A and stops further edge comparisons at step 416 until a path adjustment with respect to edge 2A within the path 406A the has occurred. The collision detector 116 then provides a path adjustment indication to the path processor 114, which performs path adjustment as discussed above in reference to FIGS. 2A-2B.

In some implementations, the collision detector 116 repeats the collision detection procedure depicted in FIG. 4 after a path has been adjusted. For example, the collision detector 116 can generate a signal to re-evaluate edges after the path 406A has been adjusted to avoid the possible collision identified at step 414. In such implementations, the collision detector 116 recursively executes the edge-to-edge comparisons between the adjusted path 406A and the path 406B to confirm that the adjusted path 406A does not involve a possible collision. For instance, the collision detector 116 can repeat step 414 with an adjusted edge during time points $T_2$ and $T_3$ to confirm that a collision is no longer likely to occur. In some instances, where multiple alternatives are available for path adjustment, the collision detector 116 may perform the comparison techniques for each alternative to determine which, if any, of the alternative paths are likely to involve a collision.

The path processor 114 can use a variety of techniques to adjust paths based on the comparison of paths specified by two or more PRMs. In some instances, the path processor 114 adjusts only one path specified by a PRM relative to another PRM. In the example depicted in FIG. 4, the path processor 114 can adjust path 406A but leave path 406B as-is in preventing the likelihood of a collision occurring between robotic devices 120A and 120B. In other instances, the path processor 114 can adjust multiple paths by enough to prevent a detected collision. In the example depicted in FIG. 4, the path processor 114 may adjust both the paths 406A and 406B by a smaller amount than what may be needed to adjust only a single path to avoid a collision.

In some implementations, the path processor 114 may employ a prioritization scheme that enables it to determine which path to adjust and/or the degree to which the path should be adjusted. The prioritization scheme can be used to ensure that higher prioritization paths are not adjusted during the collision prevention. For example, if the robotic device 120A is identified as a higher priority object than the robotic device 120B, then during path adjustment, the path processor 114 may keep the path 406A unchanged due to its higher prioritization but adjust only path 406B so that the potential collision detected at step 414 is prevented.

Figure 5:
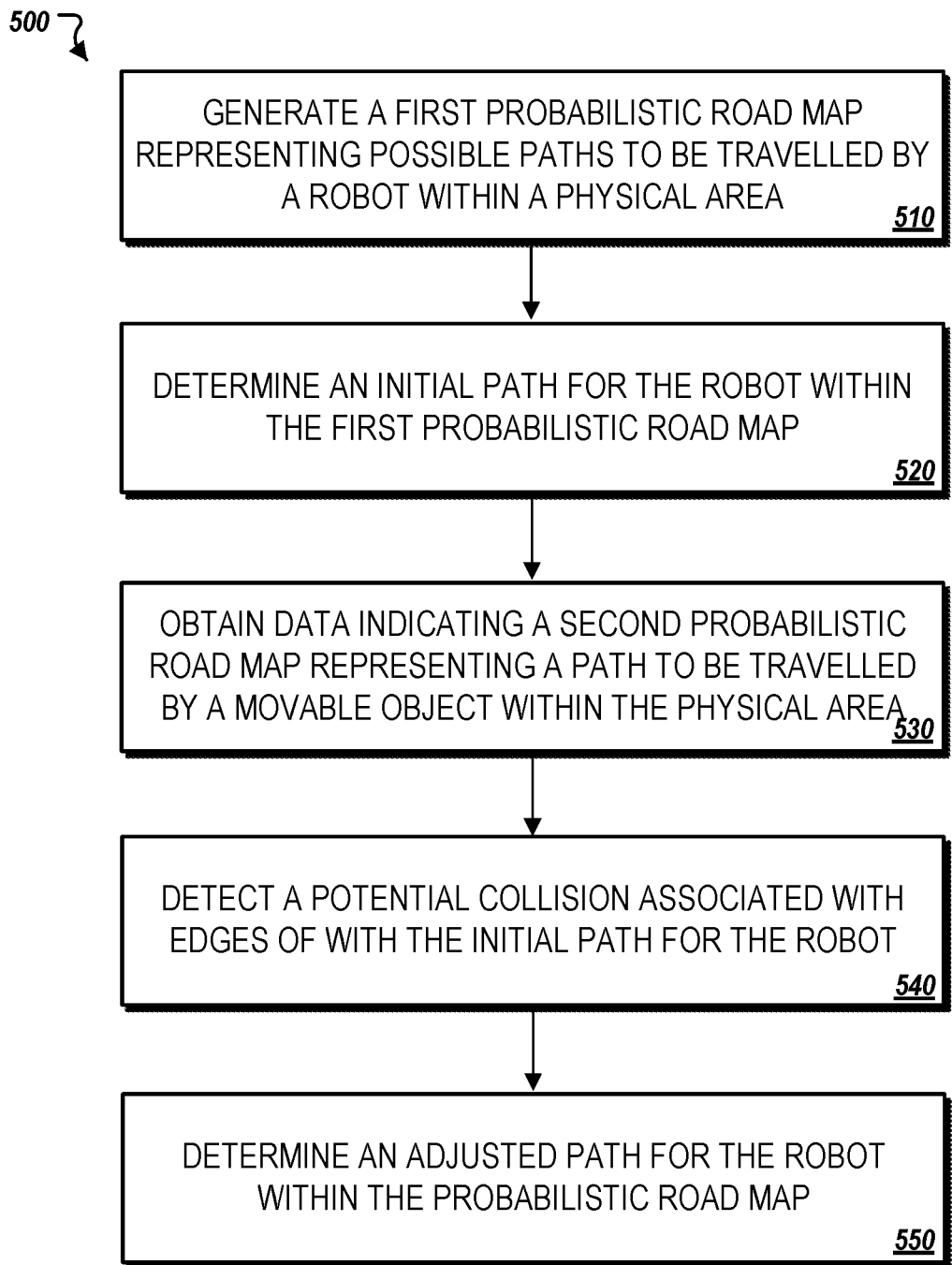
FIG. 5 illustrates an example of a process for dynamically adjusting a planned path for a robot.

FIG. 5 illustrates an example of a process 500 for dynamically adjusting a planned path for a robot. Briefly, the process 500 can include the operations of generating a first probabilistic road map representing possible paths to be travelled by a robot within a physical area (510), determining an initial path for the robot within the first probabilistic road map (520), obtaining data indicating a second probabilistic road map representing a path to be travelled by a movable object within the physical area (530), detecting a potential collision associated with edges of the initial path for the robot (540), and determining an adjusted path for the robot within the probabilistic road map (550).

In general, the process 500 is described in reference to system 100, although other types of motion planning systems can be configured to execute the operations of the process 500. For example, in some implementations, the operations of the process 500 are performed by a system that uses probabilistic motion planning to compare swept volume profiles of individual edges of two or more PRMs. Additionally, the operations of the process 500 can be performed by different components of the system 100, which can be implemented on one or more computing devices. In other implementations, where the system 100 is implemented on a remote server system, the operations of the process 500 can be executed by the remote server system.

In more detail, the process 500 include the operation of generating a first probabilistic road map representing possible paths to be travelled by a robot within a physical area (510). For example, the roadmap generator 112 generates a PRM 104 representing possible paths to be travelled by the robotic device 120 within a physical area. The PRM 104 can specify a set of edges that each connect nodes of the PRM 104. The PRM 104 can be associated with swept volume profiles for each of its edges. For instance, in the example depicted in FIG. 3, edges "AB," "AC," "CB," "CD," and "BD" are associated with swept volume profiles 306, 308, 314, 316, and 312, respectively.

As discussed above, the swept volume profile data 116B includes edge-specific swept volume profiles represents a maximum traversable movement by the robotic device 120 in a physical space in association with an individual edge within a PRM. In some instances, the swept volume profiles are stored as a set of two-dimensional swept volume images that represent a maximum traversable area by the robotic device 120 within the physical space. In other instances, the swept volume profiles are stored as a set of three-dimensional swept volume voxels that represent a maximum traversable volume by the robotic device within the physical space. Depending on the complexity required for motion planning, the system 100 can perform collision detection using two-dimensional images representing swept volume profiles (as shown in FIG. 4), or alternatively, perform more precise, yet computationally demanding, collision detection using three-dimensional voxels representing swept volume profiles.

The process 500 includes the operation of determining an initial path for the robot within the first probabilistic road map (520). For example, the path generator 114A can determine an initial path 106A for the robotic device 120 within the PRM 104. The initial path 106A can specify a subset of edges from among the edges within the PRM 104 that represent motion of the robotic device 120 from a start point and an end point specified in the query 102. For instance, in the example depicted in FIG. 2A, a path 206 specifies eight connected edges from a start point 204A to an end point 204B.

The process 500 includes the operation of obtaining data indicating a second probabilistic road map representing a path to be travelled by a movable object within the physical area (530). For example, the collision detector 116 can obtain region data 116A indicating a second PRM representing a path to be travelled by a movable object within the physical area. The second PRM can include a second set of edges that connect nodes within the second PRM and swept volume profile of the movable object for each edge included in the second set of edges. The movable object can represent another robotic device that is expected to travel in the physical area during a time period in which the robotic device 120 is planned to travel in the same physical area. For instance, in the example depicted in FIG. 4, the collision detector 116 evaluates PRM 402B and swept volume profile data 404B of the robotic device 120B in relation to PRM 402A and swept volume profile data 404A of the robotic device 120A.

The process 500 includes the operation of detecting a potential collision associated with edges of the initial path for the robot (540). For example, the collision detector 116 can generate collision data 108 indicating a potential collision detected in a portion of the initial path 206A. The potential collision can be detected based on comparing the swept volume profile data of the robotic device 120 and the movable objects and identifying an overlap. As discussed above in reference to FIG. 4, an overlap indicates a possibility that the robotic device 120 and the movable objects will traverse to the same region of the physical area around the same time point. In the example depicted in FIG. 4, the collision detector 116 detects a potential collision at step 414 based on determining that edge 2A within the PRM 402A has a swept volume profile that overlaps with the swept volume profile of edge 1B within the PRM 402B.

The process 500 includes the operation of determining an adjusted path for the robot within the probabilistic road map (550). For example, the path adjuster 114B determines an adjusted path 106B for the robotic device 120 within the PRM 104. The adjusted path 106B can specify a different subset of edges than the initial path 106A that avoids the potential collision detected in step 540. For instance, in the example depicted in FIGS. 2A-2B, the adjusted path 206B does not include edges of the initial path 206A that are identified as being affected by the collision region 208. In this example, the adjusted path 206B also shares certain edges, such as the edge that connect the start point 204A to an intermediate node, and the edge that connects an intermediate node to the end point 204B. In this regard, the path adjuster 115B adjusts a portion of the initial path 206A without having to re-calculate an entirely new path.

In some implementations, the path adjuster 114B determines the adjusted path 106B based on selecting an alternative path from among a set of multiple alternative paths 113. For instance, in the example depicted in FIG. 2B, an adjusted path is determined by selecting adjusted path 206B from among three alternative paths 206A, 206B, and 206C, which are identified as alternative paths to the path 206. In this example, the path 206B is selected as the adjusted path based on a path score that indicates that the path 206B is the shortest path from among the three alternative paths. As shown in FIG. 2B, each of the paths 206A-C share the same start point 204A and end point 204B as the path 206, but include a different set of intermediate nodes and edges that represent alternative traversal paths that avoid a potential collection.

In some implementations, the path adjuster 114B can invalidate the initial path 106A and generate a new path entirely instead of adjusting a portion of the initial path 206A to generate the adjusted path 106B, as discussed above. In such implementations, the path processor 114 can identify the number of edges of the initial path 106A are affected by a potential collision and determine that the number of affected edges satisfies a predetermined threshold, e.g., greater than 50% affected edges among all edges of the initial path 106A. The path adjuster 114B invalidates the initial path 106A based on the determination and recalculates a new path for the robotic device 120 within the PRM 104. For example, the path adjuster 114B can identify an entirely new path between the start point and end point of the query 102 so that the new path and the initial path do not share a large portion of intermediate nodes, e.g., paths 206A and 206C as depicted in FIG. 2B.

In some instances where the path adjuster 114B recalculates a new path, the path adjuster 114B can evaluate the new path to determine whether it actually represents a different path from the initial path 106A. For example, the path adjuster 114B can identify edges that are specified by the new path that were not specified by the initial path 106A and compare the number of new edges to a threshold value. If the number of new edges exceeds the threshold value, e.g., greater than 50% new edges from among edges of the new path, then the path adjuster 114B determines that the newly calculated path actually represents a new, different, and distinct path from the initial path 106A.

Figure 6:
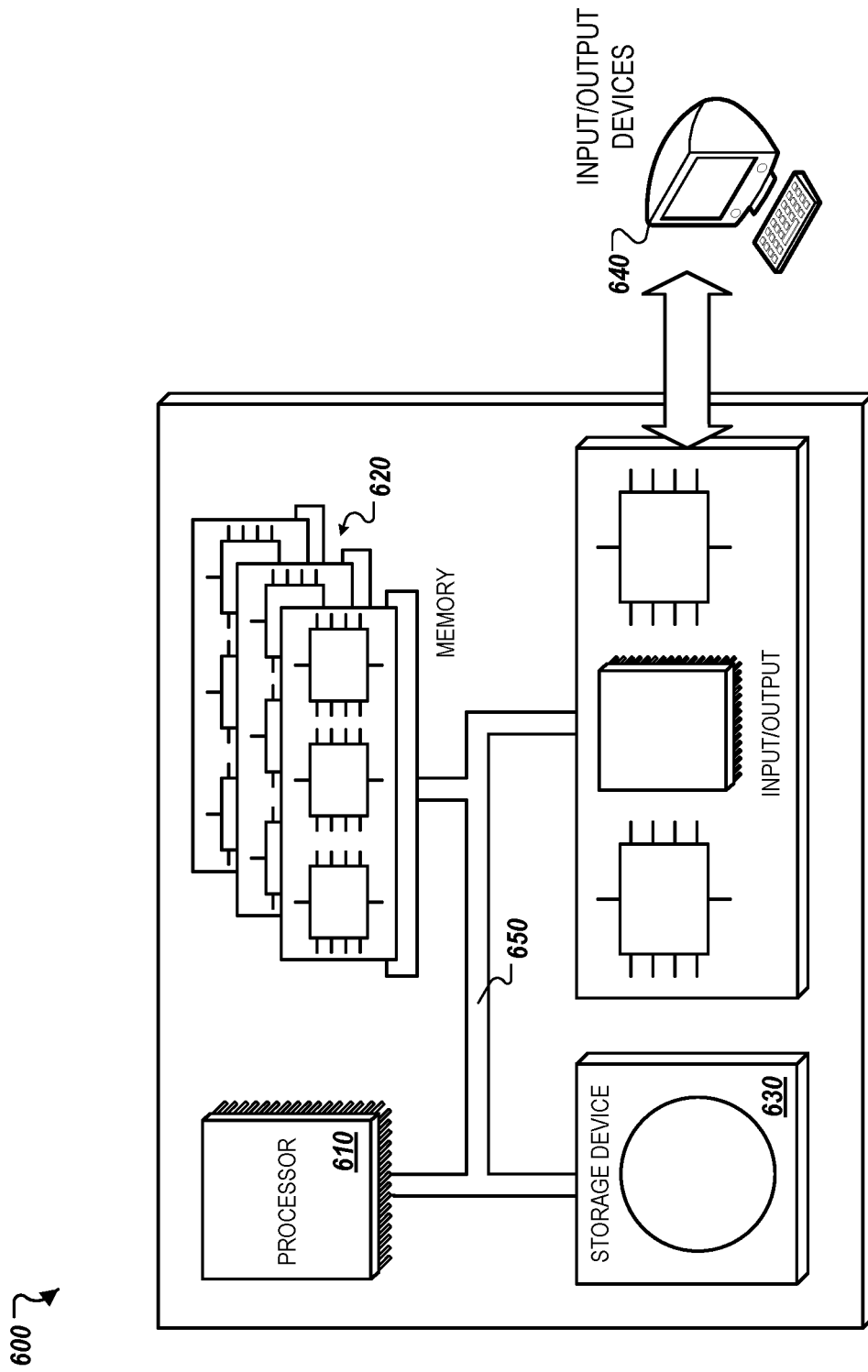
FIG. 6 illustrates an example of a computer system that can be used to carry out the operations described in association with any of the computer-implemented methods described herein.

FIG. 6 is a schematic diagram of a system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 600 includes a processor 610, a memory 620, a storage device 630, and an input/output device 640. Each of the processor 610, memory 620, storage device 630, and input/output device 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method performed by one or more computers, the method comprising:
receiving, by the one or more computers, a first path in a first probabilistic road map for a robot to travel through a physical area, the first path specifying a first subset of edges in the first probabilistic road map, wherein each edge is associated with a respective swept volume profile representing a volume of space occupied by the robot while traversing the edge, wherein the first path assigns a respective first time interval to each edge of the first subset of edges;
receiving, by the one or more computers, a second path in a second probabilistic road map for a movable object to travel through the physical area, the second path specifying a second subset of edges in the second probabilistic road map, wherein each edge is associated with a respective swept volume profile representing a volume of space occupied by the object while traversing the edge, wherein the second path assigns a respective second time interval to each edge of the second subset of edges;
determining that an intersection occurs between i) a first volume of space represented by a swept volume profile for a first edge of the first subset of edges for the robot and ii) a second volume of space represented by a swept volume profile for a second edge of the second subset of edges for the movable object during an overlapping time period between a first time interval assigned to the first edge and a second time interval assigned to the second edge;
in response, evaluating a plurality of collision-free alternative edges for the robot in the first probabilistic road map, each collision-free alternative edge having a respective swept volume profile in the first probabilistic road map representing a respective volume of space that does not intersect the second volume of space that the movable object will occupy during the overlapping time period, and
based on the evaluation, adding a collision-free alternative edge to the first path to generate an adjusted path for the robot using the first probabilistic road map.

2. The method of claim 1, wherein determining that the intersection occurs comprises:
comparing the respective swept volume profiles of the robot that are associated with the first subset of edges specified by the first path during all of the respective first time intervals and the respective swept volume profiles of the movable object that are associated with the second subset of edges during all of the respective second time intervals corresponding to the respective first time intervals;
determining, based on the comparison, that at least one of the respective swept volume profiles of the robot that are associated with the first subset of edges specified by the first path intersects with at least one of the respective swept volume profiles of the movable object that are associated with the second subset of edges specified by the second path during an overlapping time period between one of the respective first time intervals and one corresponding second time interval of the respective second time intervals; and determining that the intersection occurs based on the determination that the at least one of the respective swept volume profiles of the robot associated with the first subset of edges specified by the first path intersects with the at least one of the respective swept volume profiles of the movable object associated with the second subset of edges specified by the second path during the overlapping time period.

3. The method of claim 1, wherein each swept volume profile included in the respective swept volume profiles of the robot for the first path specifies a maximum traversable area by the robot within a physical space in association with a particular edge of the first subset of edges.

4. The method of claim 1, wherein each swept volume profile included in the respective swept volume profiles of the robot for the first path specifies a set of voxels representing the maximum traversable volume by the robot within a physical space in association with a particular edge of the first subset of edges.

5. The method of claim 1, wherein the robot is a first robot, and wherein the movable object comprises a second robot that is planned to or expected to travel within the physical area while the first robot travels in the physical area.

6. The method of claim 1, wherein generating the adjusted path for the robot using the first probabilistic road map comprises:
identifying a plurality of alternative paths corresponding to the first path, wherein: each alternative path within the plurality of alternative path includes (i) a first node representing a start point of the first path and (ii) a second node representing an end point of the first path, and
each alternative path includes a different set of intermediate edges between the first node and the second node; and
selecting a particular alternative path from the plurality of alternative paths as the adjusted path.

7. The method of claim 1, wherein:
the method further comprises determining that a number of edges included in the first subset of edges that have respective swept volume profiles intersecting with respective swept volume profiles of the second path satisfies a predetermined threshold; and
generating another adjusted path for the robot using the first probabilistic road map comprises:
invalidating the first path based on the determination that the number of edges included in the first subset of edges that have respective swept volume profiles intersecting with respective swept volume profiles of the second path satisfies the predetermined threshold; and
recalculating a new path for the robot as the other adjusted path using the first probabilistic road map.

8. The method of claim 1, comprising determining one or more intersections occur between one or more edges of the first subset of edges and one or more corresponding edges of the second subset of edges during one or more overlapping time periods between respective first time intervals and second time intervals corresponding to the respective first time intervals; and
wherein generating the adjusted path for the robot comprises re-routing travel of the robot such that the adjusted path omits the one or more edges of the first subset of edges and includes one or more of the plurality of collision-free alternative edge.

9. The method of claim 1, wherein determining that the intersection occurs comprises:
determining a time synchronization for travel of the robot along the first path and travel of the movable object along the second path; and
selectively comparing swept volume profiles for respective edges of the first path and the second path based on the time synchronization.

10. The method of claim 1, determining that the intersection occurs comprises:
identifying, for each of the respective first time intervals, one or more first edges of the first subset of edges that the robot is expected to travel along the first path during the first time interval;
identifying, for each of the respective second time intervals, one or more second edges of the second subset of edges that the movable object is expected to travel along the second path during the second time interval; and
comparing, for each overlapping time period between each of the respective first time intervals and each corresponding second time interval of the respective second time intervals, the respective swept volume profiles for the one or more first edges expected to be traveled by the robot and the one or more second edges expected to be traveled by the movable object during the overlapping time period to determine whether the intersection occurs.

11. A system comprising:
one or more computers; and
one or more storage devices storing instructions that, when executed by the one or more computers, cause the one or more computers to perform operations comprising:
receiving, by the one or more computers, a first path in a first probabilistic road map for a robot to travel through a physical area, the first path specifying a first subset of edges in the first probabilistic road map, wherein each edge is associated with a respective swept volume profile representing a volume of space occupied by the robot while traversing the edge, wherein the first path assigns a respective first time interval to each edge of the first subset of edges;
receiving, by the one or more computers, a second path in a second probabilistic road map for a movable object to travel through the physical area, the second path specifying a second subset of edges in the second probabilistic road map, wherein each edge is associated with a respective swept volume profile representing a volume of space occupied by the object while traversing the edge, wherein the second path assigns a respective second time interval to each edge of the second subset of edges;
determining that an intersection occurs between i) a first volume of space represented by a swept volume profile for a first edge of the first subset of edges for the robot and ii) a second volume of space represented by a swept volume profile for a second edge of the second subset of edges for the movable object during an overlapping time period between a first time interval assigned to the first edge and a second time interval assigned to the second edge;
in response, evaluating a plurality of collision-free alternative edges for the robot in the first probabilistic road map, each collision-free alternative edge having a respective swept volume profile in the first probabilistic road map representing a respective volume of space that does not intersect the second volume of space that the movable object will occupy during the overlapping time period, and based on the evaluation, adding a collision-free alternative edge to the first path to generate an adjusted path for the robot using the first probabilistic road map.

12. The system of claim 11, wherein determining that the intersection occurs comprises:

comparing the respective swept volume profiles of the robot that are associated with the first subset of edges specified by the first path during all of the respective first time intervals and the respective swept volume profiles of the movable object that are associated with the second subset of edges during all of the respective second time intervals corresponding to the respective first time intervals;

determining, based on the comparison, that at least one of the respective swept volume profiles of the robot that are associated with the first subset of edges specified by the first path intersects with at least one of the respective swept volume profiles of the movable object that are associated with the second subset of edges specified by the second path during an overlapping time period between one of the respective first time intervals and one corresponding second time interval of the respective second time intervals; and determining that the intersection occurs based on the determination that the at least one of the respective swept volume profiles of the robot associated with the first subset of edges specified by the first path intersects s with the at least one of the respective swept volume profiles of the movable object associated with the second subset of edges specified by the second path during the overlapping time period.

13. The system of claim 11, wherein each swept volume profile included in the respective swept volume profiles of the robot for the first path specifies a maximum traversable area by the robot within a physical space in association with a particular edge of the first subset of edges.

14. The system of claim 11, wherein each swept volume profile included in the respective swept volume profiles of the robot for the first path specifies a set of voxels representing the maximum traversable volume by the robot within a physical space in association with a particular edge of the first subset of edges.

15. The system of claim 11, wherein the robot is a first robot, and wherein the movable object comprises a second robot that is planned to or expected to travel within the physical area while the first robot travels in the physical area.

16. The system of claim 11, wherein generating the adjusted path for the robot using the first probabilistic road map comprises:

identifying a plurality of alternative paths corresponding to the first path, wherein:
  each alternative path within the plurality of alternative path includes (i) a first node representing a start point of the first path and (ii) a second node representing an end point of the first path, and
  each alternative path includes a different set of intermediate edges between the first node and the second node; and
selecting a particular alternative path from the plurality of alternative paths as the adjusted path.

17. One or more non-transitory computer-readable storage devices encoded with computer program instructions that, when executed by one or more computers, cause the one or more computers to perform operations comprising:

receiving, by the one or more computers, a first path in a first probabilistic road map for a robot to travel through a physical area, the first path specifying a first subset of edges in the first probabilistic road map, wherein each edge is associated with a respective swept volume profile representing a volume of space occupied by the robot while traversing the edge, wherein the first path assigns a respective first time interval to each edge of the first subset of edges;

receiving, by the one or more computers, a second path in a second probabilistic road map for a movable object to travel through the physical area, the second path specifying a second subset of edges in the second probabilistic road map, wherein each edge is associated with a respective swept volume profile representing a volume of space occupied by the object while traversing the edge, wherein the second path assigns a respective second time interval to each edge of the second subset of edges;

determining that an intersection occurs between i) a first volume of space represented by a swept volume profile for a first edge of the first subset of edges for the robot and ii) a second volume of space represented by a swept volume profile for a second edge of the second subset of edges for the movable object during an overlapping time period between a first time interval assigned to the first edge and a second time interval assigned to the second edge;

in response, evaluating a plurality of collision-free alternative edges for the robot in the first probabilistic road map, each collision-free alternative edge having a respective swept volume profile in the first probabilistic road map representing a respective volume of space that does not intersect the second volume of space that the movable object will occupy during the overlapping time period, and based on the evaluation, adding a collision-free alternative edge to the first path to generate an adjusted path for the robot using the first probabilistic road map.

18. The one or more non-transitory computer-readable storage devices of claim 17, wherein determining that the intersection occurs comprises:

comparing the respective swept volume profiles of the robot that are associated with the first subset of edges specified by the first path during all of the respective first time intervals and the respective swept volume profiles of the movable object that are associated with the second subset of edges during all of the respective second time intervals corresponding to the respective first time intervals;

determining, based on the comparison, that at least one of the respective swept volume profiles of the robot that are associated with the first subset of edges specified by the first path intersects with at least one of the respective swept volume profiles of the movable object that are associated with the second subset of edges specified by the second path during an overlapping time period between one of the respective first time intervals and one corresponding second time interval of the respective second time intervals; and determining that the intersection occurs based on the determination that the at least one of the respective swept volume profiles of the robot associated with the first subset of edges specified by the first path intersects with the at least one of the respective swept volume profiles of the movable object that are associated with the second subset of edges specified by the second path during the overlapping time period.

\* \* \* \* \*